United States Patent
Tyler et al.

(10) Patent No.: US 9,538,349 B2
(45) Date of Patent: Jan. 3, 2017

(54) SYSTEM AND METHOD FOR MANAGING ACCESS TO A SERVICE FOR A COMMUNICATION DEVICE

(71) Applicant: BLACKBERRY LIMITED, Waterloo (CA)

(72) Inventors: Micheal Tyler, Fredericton (CA); Paul Andrew Graham, Pleasant Villa (CA); Lenworth Richard Rose, Ottawa (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 712 days.

(21) Appl. No.: 13/920,784

(22) Filed: Jun. 18, 2013

(65) Prior Publication Data

US 2014/0112206 A1 Apr. 24, 2014

Related U.S. Application Data

(63) Continuation of application No. 13/656,054, filed on Oct. 19, 2012, now Pat. No. 8,494,488.

(51) Int. Cl.
*H04W 4/00* (2009.01)
*H04W 4/20* (2009.01)
*H04W 8/18* (2009.01)

(52) U.S. Cl.
CPC ............... *H04W 4/20* (2013.01); *H04W 4/001* (2013.01); *H04W 8/18* (2013.01); *H04W 4/206* (2013.01)

(58) Field of Classification Search
None
See application file for complete search history.

(56) References Cited

U.S. PATENT DOCUMENTS

| | | |
|---|---|---|
| 2003/0224781 A1 | 12/2003 | Milford et al. |
| 2004/0088253 A1 | 5/2004 | Crispyn et al. |
| 2004/0148237 A1 | 7/2004 | Bittmann et al. |
| 2004/0234060 A1 | 11/2004 | Tammi et al. |
| 2007/0112641 A1 | 5/2007 | Turner et al. |
| 2008/0098304 A1 | 4/2008 | Coutts et al. |
| 2008/0214173 A1 | 9/2008 | Preiss et al. |
| 2012/0077464 A1 | 3/2012 | Nair et al. |

FOREIGN PATENT DOCUMENTS

| | | |
|---|---|---|
| EP | 1887507 A1 | 2/2008 |
| WO | WO 2006/010156 | 1/2006 |

*Primary Examiner* — Kwang B Yao
*Assistant Examiner* — Adam Duda
(74) *Attorney, Agent, or Firm* — Perry + Currier, Inc.

(57) ABSTRACT

A system, method and device for managing requests for services by a communication device in a communication network are provided. The method comprises: receiving a request for a service provided through the communication network; determining whether an account associated with the device has all features required to access the service; when the all features are not provided by the account displaying a first message on a display of the device indicating that access to the service is denied for the device, identifying alternative accounts for the network, displaying a second message on the display listing the alternative accounts and when a selection is provided of a selected account from the alternative accounts, sending a request to an account manager to update the account to the selected account for the device; and when the selected account is activated for the device providing access to the service.

20 Claims, 11 Drawing Sheets

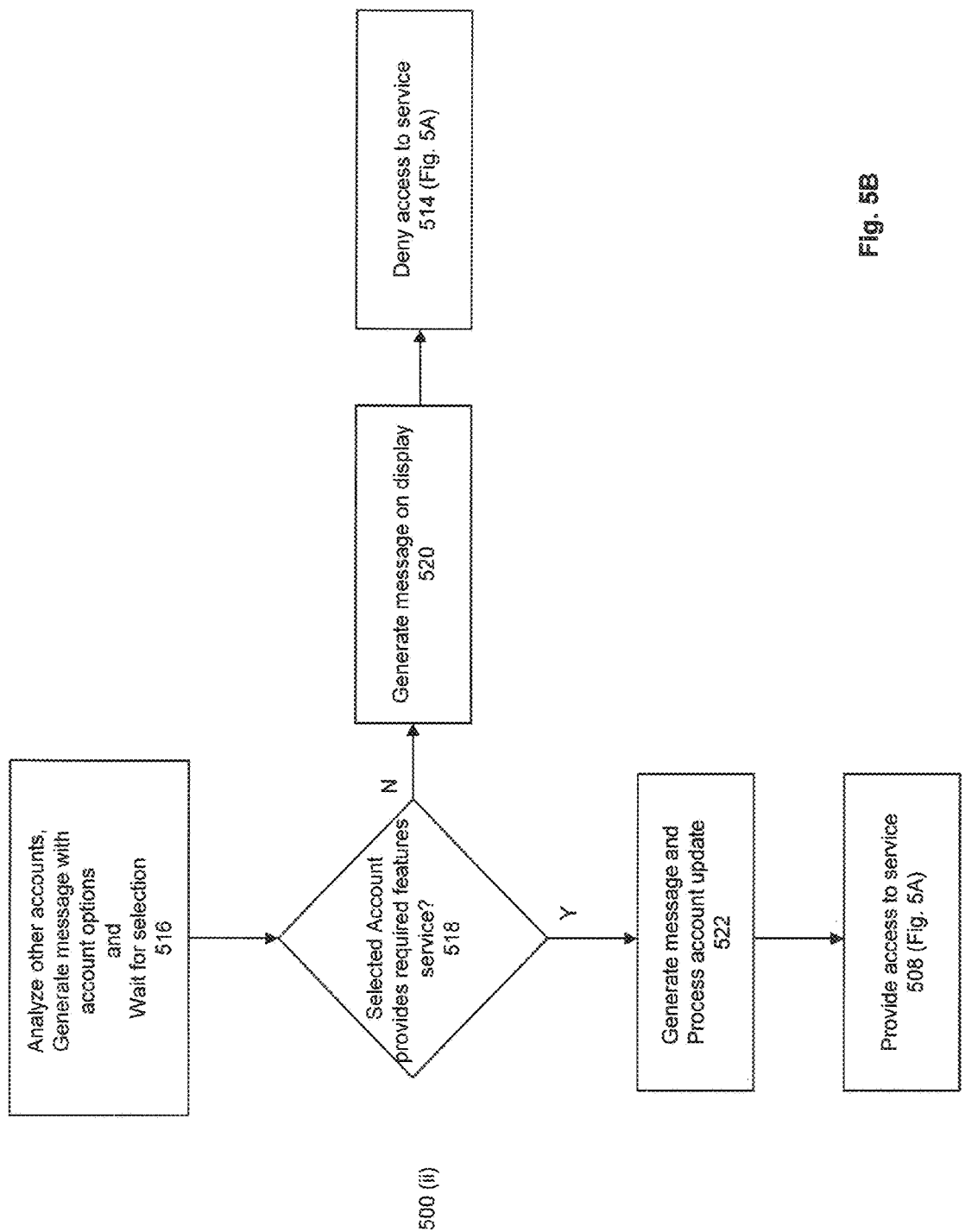

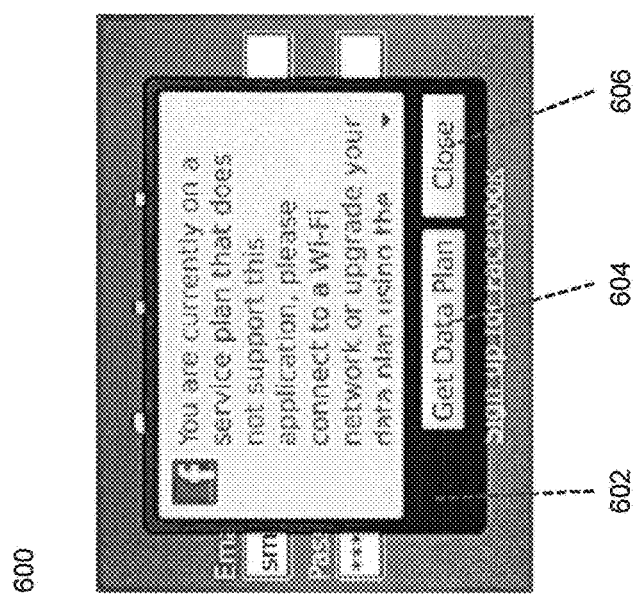
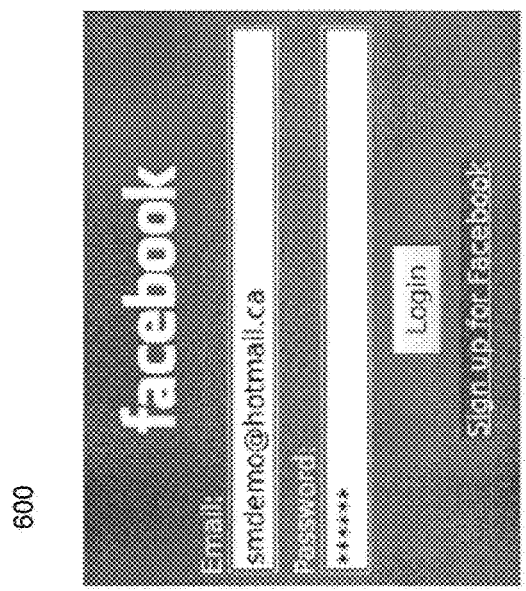
Fig. 6A

| Plan Selections | |
|---|---|
| Account A – Enhanced – with Tethering | $65 / month |
| Account B – Pro | $35 / month |
| Account C – Standard | $25 / month |
| Account D – Limited, no Facebook | $15 / month |
| Select | Cancel |

608a

| Plan Selections | |
|---|---|
| Account A – Enhanced – with Tethering | $65 / month |
| Account B – Pro | $35 / month |
| Account C – Standard | $25 / month |
| Account D – Limited, no Facebook | $15 / month |
| Select | Cancel |

608b

— 610a
— 610b
— 610c
— 610d

| Plan Selections | |
|---|---|
| Account A – Enhanced – with Tethering | $65 / month |
| Account B – Pro | $35 / month |
| Select | Cancel |

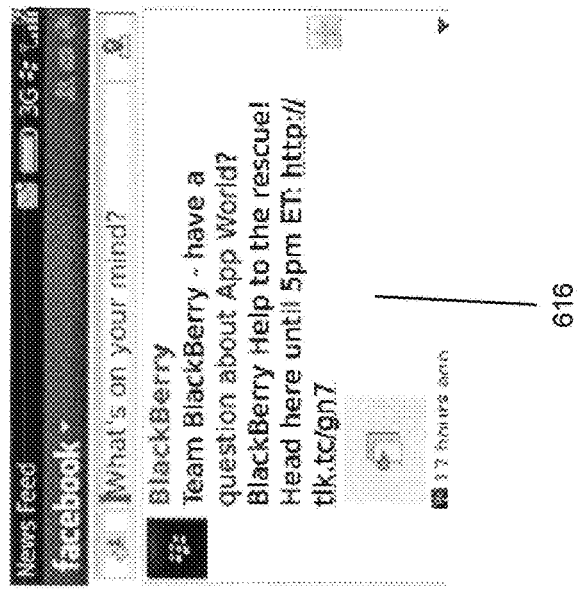
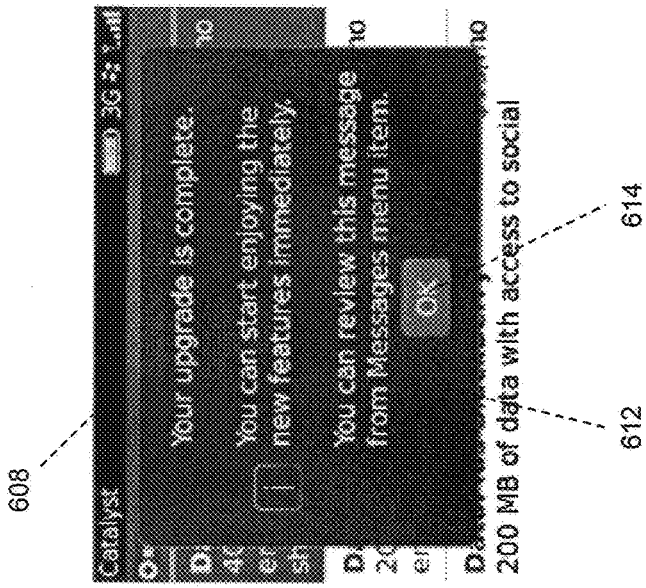
Fig. 6C

SYSTEM AND METHOD FOR MANAGING ACCESS TO A SERVICE FOR A COMMUNICATION DEVICE

RELATED APPLICATION

This application is a continuation application of U.S. patent application Ser. No. 13/656,054 filed on Oct. 19, 2012.

FIELD OF DISCLOSURE

The disclosure provided herein describes generally a system and method of managing access to a service provided for a communication device in a communication network. In particular, an embodiment generates messages and manages account modifications for the device when the communication device lacks an account feature that would allow the service to be provided on the device.

BACKGROUND OF DISCLOSURE

A carrier for a communication network, such as AT&T in the U.S. and Bell in Canada (both trade-marks), offers communication devices and services to customers to allow the customers to access the network and communicate with others. Typically a carrier offers a range of types of accounts that have different service levels providing a matrix of levels of service and features supported by the network. The types typically range from a very basic level (e.g. limited voice only services), to a standard level (e.g. some enhanced voice services, text messaging and email services) to an enhanced level (e.g. all services of the basic level plus Internet access, Wi-Fi, Facebook (trade-mark) access, tethering and others).

A person using a communication device in the network may not recall what account features have been provided for the device. If the person makes a request on the communication device for a service for which the device (and/or its associated account) is not configured to allow, then a generic message is currently provided on the device indicating that the service is not available. Such a message is misleading, as the service may be available, but the user's current account may not be allowed access to the service.

There is a need for a system and method which addresses deficiencies in the prior art.

BRIEF DESCRIPTION OF THE DRAWINGS

Embodiments of the disclosure will now be described, by way of example only, with reference to the accompanying drawings, in which:

FIGS. 5A and 5B are sections of a flowchart of an example account modification process executed by the service access process in the communication device of FIG. 2 according to an embodiment;

FIGS. 6A, 6B, 6C and 6D are snapshots of exemplary graphical user interfaces (GUIs) that are generated on a display of the communication device of FIG. 2 during execution of the service access process of FIGS. 5A and 5B according to an embodiment.

DESCRIPTION OF EMBODIMENTS

Figure 1:
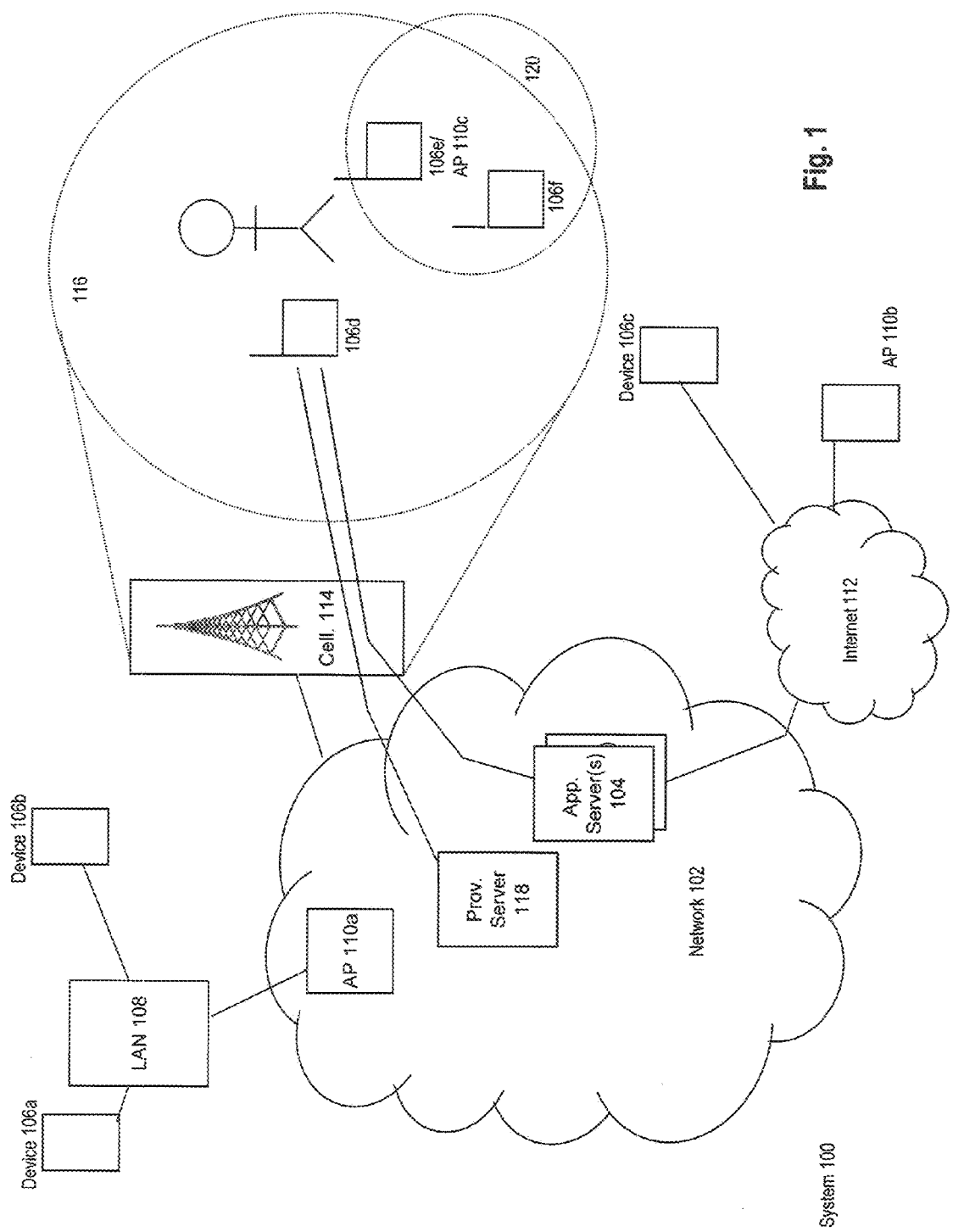
FIG. 1 is a schematic diagram of a wireless communication network having a communication device in a process of accessing an application server in a network according to an embodiment.
Figure 2:
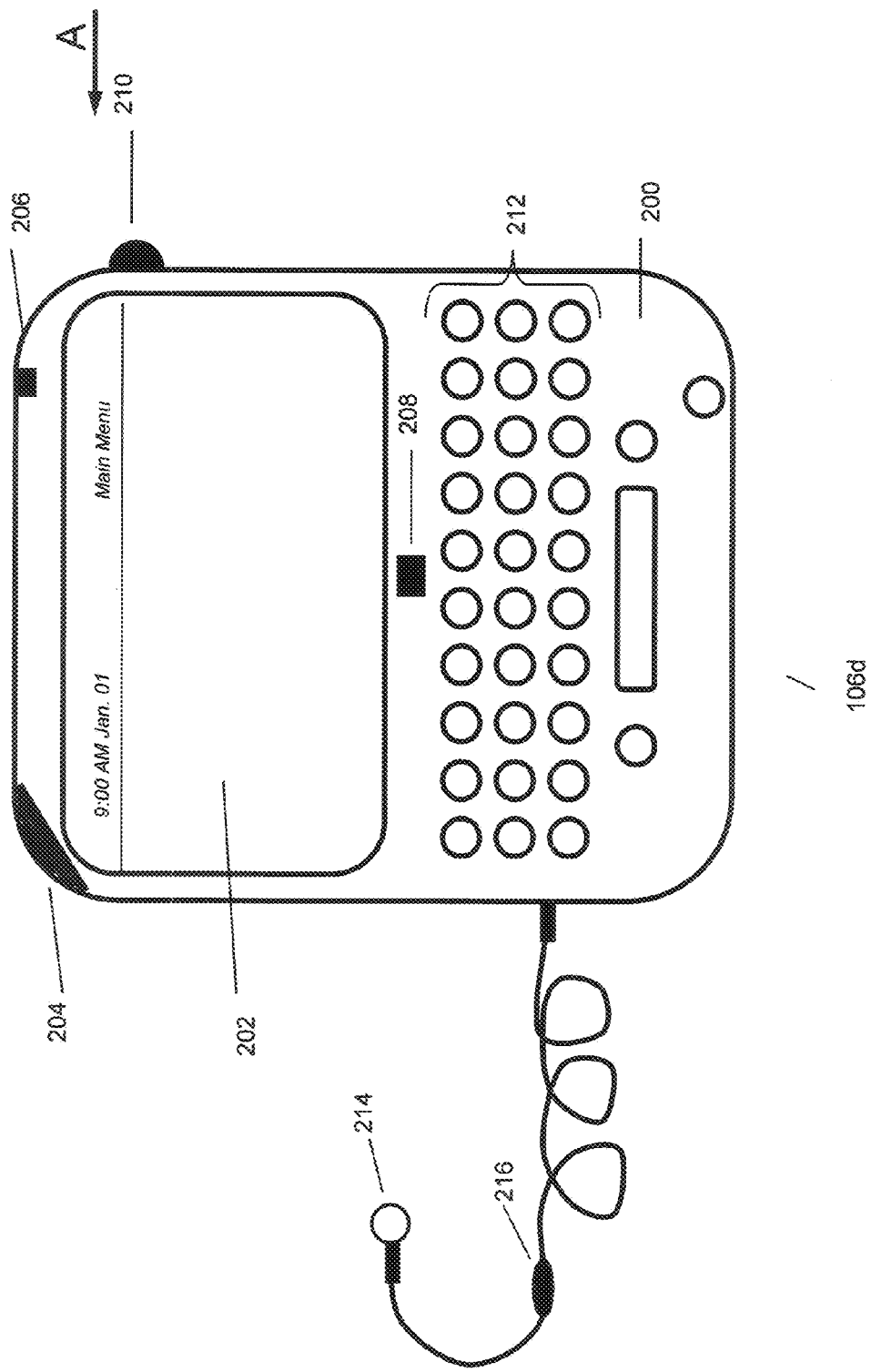
FIG. 2 is a schematic representation of the communication device of FIG. 1 implementing a service access process according to an embodiment.

Details of example embodiments are provided herein. The description which follows and the embodiments described therein are provided by way of illustration of an example or examples of particular embodiments of principles of the present disclosure. These examples are provided for the purposes of explanation and not limitation of those principles and of the disclosure. In the description which follows, like parts are marked throughout the specification and the drawings with the same respective reference numerals.

Generally an embodiment provides a system, method, module and device for managing access to a service provided for a communication device in a communication network. In particular, an embodiment provides additional detailed messaging to a communication device providing information on specific requirements for an account when the communication device is requesting access to a service for which the account associated with the communication device currently does not support. Additional options are provided for the communication device to allow its user to change or modify the account to enable access to the service. Additional options are provided to show alternative access features that would provide a different access route to the service than the access route initially requested and to show alternative services that may be used instead of the requested service.

In a first aspect, a method of managing requests for a service by a communication device in a communication network is provided. The method comprises in the communication device: receiving a request for the service provided through the communication network; determining whether an account associated with the communication device has all features required to access the service; and when the all features are not provided by the account, identifying at least one alternative service to the service, displaying on a display of the communication device a list of the at least one alternative service, and upon receiving a selection of a selected alternative service from the list, initiating a request for the selected alternative service by the communication device.

The method may further comprise when the all features are not provided by the account: displaying on the display a message indicating that access to the service is denied for the communication device; identifying at least one alternative account for the communication network; displaying on the display a list of the at least one alternative account; and when a selection is provided of a selected account from the list of the at least one alternative account, sending a request to an account manager to associate the selected account with the communication device.

The method may further comprise: when the selected account is activated for the communication device providing access to the service to the communication device.

The method may further comprise: when the all features are provided by the account, providing access to the service to the communication device.

In the method, the list of the at least one alternative account may show in emphasis any account that has the all features required to provide the service to the communication device.

In the method, identifying the alternative account for the communication network may comprise: identifying all accounts available to the network that have the all features required for the communication device to access the service.

In the method, the second message may comprise the all accounts.

The method may further comprise: when a communication link between the communication device and a server for the service is not established, displaying a message on the display indicating that the communication link to the server is not established.

In the method, an address for a server associated with the service may be used to control access to the service.

In the method, the service may be a social media service; and the all features may include authorization to access the social media service.

In the method, the service may be a text messaging service; and the all features may allow access to the text messaging service.

In a second aspect, a system for managing requests for a service by a communication device is provided. The system comprises: a processor; a memory module for storing instructions for execution on the processor; and a service analysis module. The service analysis module provides instructions for execution on the processor to: receive a request for the service; determine whether an account associated with the communication device has all features required to provide the service to the communication device; and when the all features are not provided by the account, identify at least one alternative service for the service for the communication device, display on a display of the communication a list of the at least one alternative service and when a selection is provided of a selected service from the list of the at least one alternative service, initiate a request for the selected service.

In the system, when the all features are not provided by the account, the service analysis module may provide further instructions for execution on the processor to: display a message on the display indicating that access to the service is denied for the communication device; identify at least one alternative account for the communication network; display on the display a list of the at least one alternative account; and when a selected alternative account is selected from the list, send a request to an account manager to associate the selected alternative account with the communication device.

In the system, when the all features are not provided by the account, the service analysis module may provide further instructions for execution on the processor to provide approval to access to the service when the selected alternative account is activated for the communication device.

In the system, the service analysis module further may provide instructions for execution on the processor to show in emphasis any account in the list that has the all features required to provide the service to the communication device.

In the system, service analysis module further may provide instructions for execution on the processor to: identify an alternative account from all accounts available to the network that have the all features required to provide the service to the communication device; and receive the all accounts in the second message.

In the system, an address for a server associated with the service may be used to control access to the service.

The system may further comprise an interface analysis module for providing instructions for execution on the processor to: determine when the service analysis module provides approval to access to the service; and provide the access to the service for the communication device.

In the system, the service may be a social media service; and the all features may include authorization to access the social media service.

In the system, the service may be a text messaging service; and the all features may allow access to the text messaging service.

In another aspect, a method of managing a request for a service by a communication device in a communication network is provided. The method comprises in the communication device: receiving a request for a service provided through the communication network; determining whether an account associated with the communication device has all features required to access the service; when the all features are not provided by the account displaying a first message on a display of the communication device indicating that access to the service is denied for the communication device, identifying alternative accounts for the communication network, displaying a second message on the display listing the alternative accounts and when a selection is provided of a selected account from the alternative accounts, sending a request to an account manager to update the account to the selected account for the communication device; and when the selected account is activated for the communication device providing access to the service.

In the method, access to the service may be provided through a service interface module in the communication device.

The method may be executed in a module operating on the communication device.

The method may further comprise when the all features are provided by the account, providing access to the service.

In the method, identifying the alternative accounts for the communication network may comprise identifying all accounts available to the network.

In the method, the second message may comprise the all accounts available to the network.

In the method, the second message may show in emphasis any accounts of the all accounts that have all features required to provide the service to the communication device.

In the method, identifying the alternative accounts for the communication network may comprise identifying all accounts available to the network that have all features required for the communication device to access the service.

In the method, the second message may show the all accounts.

The method may further comprise when the all features are not provided by the account: tracking a list of one or more alternative services for the service; displaying a third message on the display showing the list; and upon receiving message selecting an alternative service from the list, initiating a request for the alternative service.

In the method, an address for a server associated with the service may be used to control access to the service.

The method may further comprise when a communication link between the communication device and a server for the service is not established displaying a third message on the display indicating that the communication link to the server is not established.

In the method, the service may be a social media service; and the all features may include authorization to access the social media service.

In the method, the service may be a text messaging service; and the all features may allow access to the text messaging service.

In yet another aspect, a system for managing requests for services by a communication device is provided. The system comprises: a processor; a memory module for storing instructions for execution on the processor; and a service analysis module for providing instructions for execution on the processor. The instructions include instructions to: receive a request for a service; determine whether an account associated with the communication device has all features required to provide the service to the communication device; when the all features are not provided by the account display a first message on a display of the communication device indicating that access to the service is denied for the communication device, identify alternative accounts for the communication network, display a second message on the display listing the alternative accounts and send a request to an account manager to update the account to the selected account for the communication device when a selection is provided of a selected account from the alternative accounts; and when the selected account is activated for the communication device provide approval to access to the service.

The system may further comprise an interface analysis module for providing instructions for execution on the processor to: determine when the service analysis module provides approval to access to the service; and provide the access to the service for the communication device.

In the system, the service analysis module may further provide instructions for execution on the processor to: identify all accounts available to the network; and show the all accounts available to the network in the second message.

In the system, the service analysis module may further provide instructions for execution on the processor to show in emphasis any accounts of the all accounts that have all features required to provide the service to the communication device.

In the system, the service analysis module may further provide instructions for execution on the processor to: identify the alternative accounts from all accounts available to the network that have all features required to provide the service to the communication device; and show the all accounts in the second message.

In the system, the service analysis module may further provide instructions for execution on the processor to: identify an alternative service for the service for the communication device; display a third message on the display listing the alternative service; receive message to select the alternative service; and initiate a request for the alternative service.

In the system, an address for a server associated with the service may be used to control access to the service.

In the system, the service may be a social media service; and the all features may include authorization to access the social media service.

In other aspects, various combinations of sets and subsets of the above aspects are provided.

Before discussing details on specific features of an embodiment, a description is provided on a network having a device, as a server, that provides connections to other devices, as clients, according to an embodiment. Then, details are provided on an example device in which an embodiment operates.

First, details are provided on example networks where devices according to an embodiment may operate. Referring to FIG. 1, details on a system of example networks and communication devices according to an embodiment are provided. FIG. 1 shows communication system 100 where network 102 provides access to a suite of applications, services and data as provided by application servers 104 to devices 106 (and other devices) connected to network 102.

Local area network (LAN) 108 is connected to network 102 and provides local wired and wireless connections to its devices 106a and 106b. Access point (AP) 110a provides a connection within network 102 to LAN 106. AP 110a is a communication device that contains a radio receiver/transmitter (or transceiver) and functions as a bridge between network 102 and LAN 108) for its carried communications. AP 110a may be a non-fixed wireless device and as such AP 110a is effectively another device 106.

Internet 112 may be connected to network 102 providing a connection for device 106c and AP 110b to network 102.

System 100 includes network 114 that provides wireless communication coverage to devices that are located within the wireless transmission area of a cellular network. Wireless network 114 in one embodiment is a cellular network having a transmission area defined schematically by circle 116. Devices 106d-f have wireless communication capabilities with one or more wireless networks. Cellular network 114 may have multiple transmission areas by having multiple communication towers. Provisioning server 118 may be a repository for managing accounts associated with network 114. Provisioning server 118 is shown to be in network 102, but it may be located elsewhere in system 100. Provisioning server 118 is an account managing server for network 114.

Wireless devices 106d-f communicate through a data link layer in network 114. Wireless devices 106d-f include handheld devices, cell phones and computers (either desktop or portable) having a (wireless) network card, network adapter and/or network interface controller ("NIC") installed therein.

Other networks in system 100 may be provided, such as a Wi-Fi network 120 that follows standards set by the IEEE LAN/MAN Standards Committee, known as IEEE 802, through its working group "11". The IEEE 802.11 standard defines media access control (MAC) and physical (PHY) layers in the OSI protocol model for a wireless local area network (WLAN). A Wi-Fi network is one type of WLAN. Currently, the family of IEEE 802.11 amendments encompass six wireless modulation techniques that all use the same communication protocol among their communicating elements. Other modulation techniques may be used. Current versions of IEEE 802.11 networks include: IEEE 802.11a, b, g and n, representing PHY amendments to IEEE 802.11. As shown, Wi-Fi network 120 is established within network 114, where device 106e acts as an AP 110c for the Wi-Fi network 120, so that devices 106e and 106f are in both networks 114 and 120.

Communication services for network 114 are offered by a network carrier, such as AT&T, Verizon, Bell and Rogers (all trade-marks). A carrier typically offers to its customers a selection of accounts providing different features, levels of service, types of service and limits to the services. It will be seen that features for accounts can follow a general progression from limited features to standard features to enhanced features. A carrier may group accounts into categories that capture this progression (e.g. personal account, business account—light, business account—standard, business account—heavy, business account—traveller, etc.). Each account may be priced according to the features provided.

As an example, a carrier for network 114 may offer the following types of accounts, where each account has the listed features, per Table A:

TABLE A

| Account Type | Cellular Services (Y/N - limit) | Text Messaging (Y/N - limit) | Internet access (Y/N - limit) | Wi-Fi (Y/N) | Social Media access (Y/N) | Map services (Y/N - limit) |
|---|---|---|---|---|---|---|
| Account A | Yes 500 minutes/ month | Yes 5000 messages/ month | Yes 20 GB/ month | Yes | Yes | Yes 100 MB/ month |
| Account B | Yes 200 minutes/ month | Yes 200 messages/ month | Yes 10 GB/ month | Yes | Yes | Yes 50 MB/ month |
| Account C | Yes 200 minutes/ month | Yes 100 messages/ month | Yes 5 GB/ month | Yes | No | Yes 10 MB/ month |
| Account D | Yes 100 minutes/ month | No | No | Yes | No | No |

Social media access as noted may refer to access to one or more websites and servers providing social media services (e.g. Facebook, MySpace, Twitter (all trade-marks), etc.). Accounts can be billed in so-called "post-paid" or "pre-paid" schemes. For a "post-paid" account, an account holder is typically invoiced by the carrier on a monthly basis for the type of account provided. Administration of the accounts, current limits for the accounts and other matters are managed by provisioning server 118.

Network 114 may also provide access to services and applications. Some example services are listed below:
  Voice communications services, where different accounts may provide different limits on the number of minutes provided per month;
  Text messaging services, where different accounts may provide different limits on the number of text messages that can be sent or received per month;
  Messaging services, such as BBM, Google Talk, Yahoo Messenger and Windows Live Messenger (all trademarks), where an account may provide access to one or more of these messaging services;
  Internet services, where different accounts may provide different limits on the amount of data that can be downloaded/uploaded (in MB or GB) per month;
  Wi-Fi services;
  Mapping service/global positioning services (GPS), such as Foursquare (trade-mark) where different accounts may provide different limits on the amount of data that can be downloaded for maps and location information;
  Social network services, such as Twitter, Facebook, Linked In, MySpace (all trade-marks) and others, where an account may provide access to one or more of these messaging services;
  Application download services, where an account may be provided with access to a certain number of "apps" that may be downloaded to the device;
  Other miscellaneous services that may be provided through a server (e.g. traffic reports, weather reports, news feeds, sports scores, RSS feeds, ring tones, media services, etc.); and
  Other services or systems that provides an identifiable (and trackable) product or service (e.g. through a stock keeping unit (SKU) number or account) and a service provider to provision it.

Administration of these services and access to these services may also be managed by provisioning server 118. In network 114, services may be provided by application servers 104 or through other devices. The accounts provided by the carrier for network 114 may offer different features that provide access to none, one or more of the above noted services, providing a matrix of account options for clients in network 114. In managing access to such services, server 118 may communicate directly with devices 106d-f and enable/disable communication features for a specific device 106. The account may be associated with a specific device (e.g. such as for a cellular device) or to a user (e.g. for an Internet account) or to both. In network 114 servers relating to the provided servers may be identified by a unique service address (e.g. an IP address) or a website domain name. As such, while an account may provide a general level of service to a network, such as the Internet, specific locations in the network may be provided with restricted access. As such, the address for a server associated with the service may be checked when an access request is made and may be used to determine whether access to the service is provided or not. Other services, such as text messaging services, may be provided as part of network 114 and as such, access to such services may be directly controlled by the carrier (e.g. through provisioning server 118).

For applications and services managed and monitored for a carrier, provisioning server may also track requirements for such services. This information may be used when a device in network 114 makes a request for a service. An analysis of any requirements and options that an account may need to have can be conducted when determining whether to provide the device with access to the service. Table B lists example requirements of example services offered through network 114 for an embodiment.

TABLE B

| Service | Required networks | Alternative networks | Alternative Service/ characteristic | Min. data available for account | Other req'mts |
|---|---|---|---|---|---|
| Facebook | Internet access | Wi-Fi, Cellular | 1. MySpace/ lower bandwidth connection 2. LinkedIn/ higher bandwidth | 10 MB | none |
| MySpace | Internet access | Wi-Fi, Cellular | 1. Facebook/ more expensive connection | n/a | None |
| LinkedIn | Internet access | Wi-Fi, Cellular | Facebook | n/a | None |
| Maps | Cellular | Wi-Fi, | 1. Google maps/ | 50 Mb | 100 min. |

TABLE B-continued

| Service | Required networks | Alternative networks | Alternative Service/ characteristic | Min. data available for account | Other req'mts |
|---------|-------------------|----------------------|-------------------------------------|-------------------------------|---------------|
|         | access            | Cellular             | high bandwidth connection needed 2. Apple Maps/ 25 GB data needed |  | remaining airtime |

With some account features described, further detail is provided on an account management feature provided by an embodiment for a network. Briefly, an embodiment provides management of an account for a communication device operating on a communication network. An embodiment also monitors for a request to access a service from the device and upon detection of the request, an embodiment compares features of the account associated with the device against any network or other requirement(s) that are required to enable the device to access to the service. If the feature(s) of the account meet the requirements, then the embodiment permits the request to be fulfilled and the device is provided access to the service. If the feature(s) do not meet the requirements, then a message is generated on the device providing details identifying why the service cannot be provided at the current instance in a graphical user interface (GUI). Also an embodiment analyzes potential alternative types of accounts for the network in an attempt to identify one or more alternative accounts that have features that would allow the device to access the service. Such alternative types of accounts are presented on the device in a GUI. The alternatives may identify different (more costly) accounts that the user may select an alternative account from the GUI to change the account. The embodiment may process the change and may initiate activation of the selected account to then allow the device to access the service. Any changes to the user's account would be reflected and updated in the account records of provisioning server 118.

One aspect of an embodiment implements account management features on device 106. For requests for services that are managed through external devices, such as through application servers 104, an embodiment provides an interface on device 106 between communications destined for servers 104 to intercept, process and modify as needed such requests. As such, there is a reduction of amendments needed for processes on server 104 to implement features of an embodiment. An aspect of an embodiment provides a supplier of the device (e.g. the carrier) with control over how its devices in its network communicate with external services.

Figure 3:
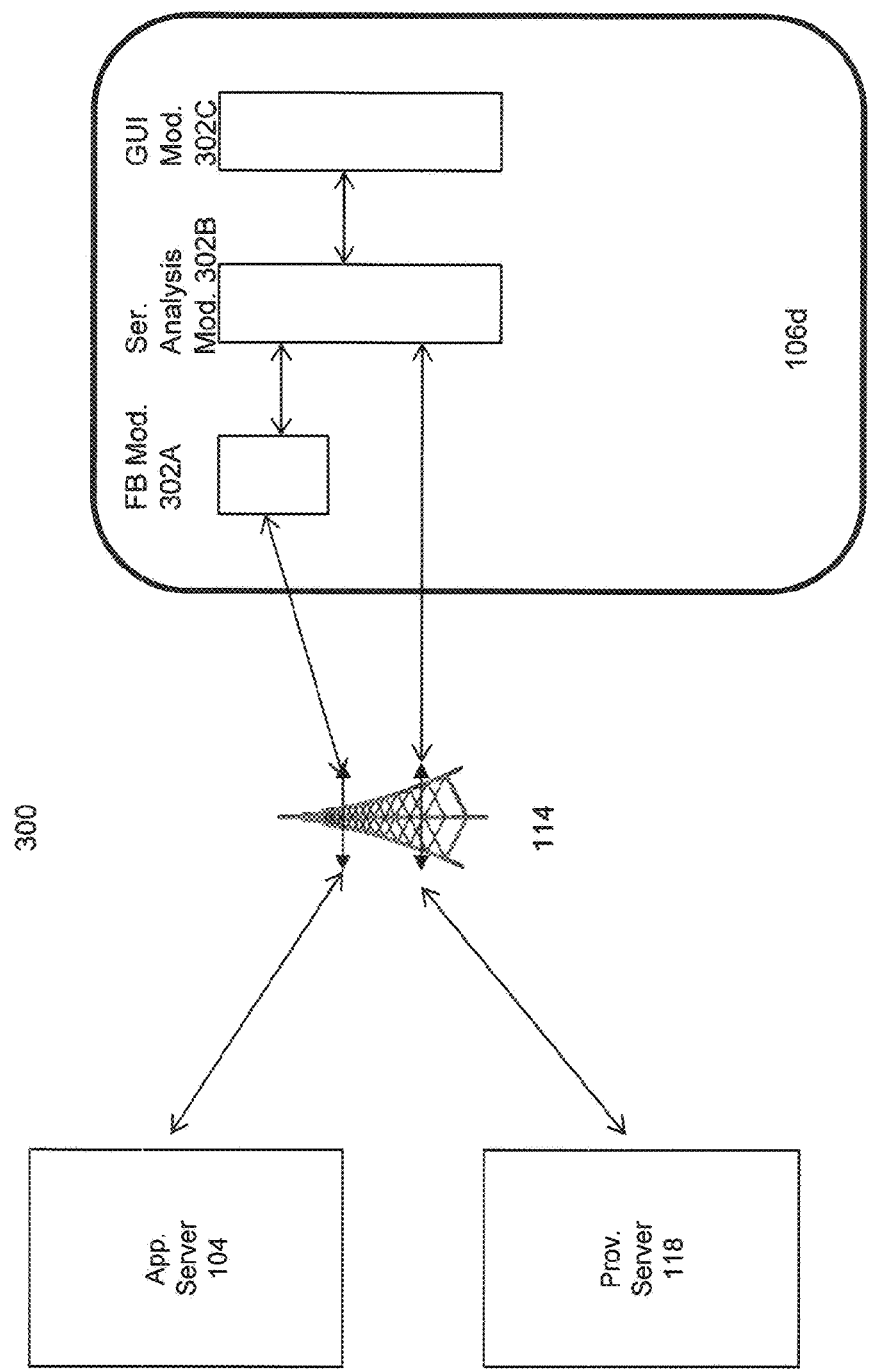
FIG. 3 is a schematic representation of the communication device of FIG. 2 and a module implementing the service access process to access the application server of FIG. 1 according to an embodiment.

Further features of an embodiment are disclosed with reference to FIG. 3, which shows part of system 100 in layout 300. Therein, device 106d in network 114 is shown that is in the process of making a request for a service provided by server 104, located in network 114. For the sake of illustration, server 104 is shown as hosting a social network application, such as Facebook (trade-mark). Server 104 may host other applications and services for services provided for the carrier for by network 114 as noted above.

Device 106d has several modules that provide processing instructions that are executed on a processor (not shown) that provide communications and other functions for device 106d. For example, device 106d has Facebook module 302A that operates as an interface between requests from device 106d to (Facebook) application server 104. Other modules 302 may provide interfaces to other services, which may be any service/website, as noted earlier. Device 106d also has service analysis module (SAM) 302B that provides an additional interface core functions of device 106d and network 114. As part of the interface functions, SAM 302B provides an additional interface for device 106d between provisioning server 118 and Facebook module 302A. As such, with Facebook module 302A and SAM 302B, network 114 and application server 104 provide a standardized interface for communicating with device 106d. This reduces the amount of special handling functions that may need to be otherwise provided to manage all requests received from devices 106 in network 114. Device 106d also has GUI module 302C, which generates a screen on a display providing a GUI showing icons for representative applications and services available to device 106d. A user may view and navigate through the various GUIs generated thereby allowing the user to highlight and select actions, applications and services to be initiated on device 106d.

For an embodiment, one flow of communications between device 106d and application server 104 is as follows. As shown, an inbound communication from application server 104 to device 106d is processed initially by Facebook module 302A, which then provides selected communications to SAM 302B, which then provides selected communications to GUI module 302C. Similarly, when a request from GUI module 302C for the service provided by application server 104 is initiated, an outbound communication from GUI module 302C is sent to SAM 302B, which then processes the communication and provides it to Facebook module 302A, which then further processes the communication and sends a standardized request to application server 104 that server 118 can recognize and process.

Also for an embodiment, another flow of communications between device 106d and provisioning server 118 is that communications relating to accounts, status of accounts and other administrative matters provided by network 114 are handled in part through communications between SAM 302B and provisioning server 118. As such, if there are issues relating to permissions for device 106d to access application server 104, part of the analysis is performed using information provided by provisioning server 118 to SAM 302B. In one embodiment, application server 104 may not need to directly communicate with provisioning server 118 when device 106d initiates a request for a service provided by server 104.

Services (and access to services) may also be deactivated for a variety of reasons (e.g. the user voluntarily cancelled an account, the service was terminated by the provider, etc.). In addition to tracking a status of services that are currently activated or available through network 114, an embodiment may also track services that an account previously had access to. This additional information may be used by an embodiment to modify parameters for an account. For example, a discount or additional marketing effort may be provided to an account holder for a service when an embodiment identifies that there is a connection between that service and a service that was discontinued for the account.

With selected components of device 106d identified, further details are provided on exemplary processing of service requests on device 106d in SAM 302B and other modules by an embodiment. SAM 302B is a module that can be inserted (as software in one embodiment) into device 106d. SAM 302B is provided as a separate module, so that if SAM 302B were removed or not installed in device 106d, device 106d would still operate. Other modules in device 106d may have software check mechanisms (e.g. installation flags, messaging routines, etc.) to determine whether SAM 302B is installed on device 106d and to provide one set of operating functions if SAM 302B is installed and another set of operating functions if SAM 302B is not installed. Further, SAM 302B may have its own software check mechanisms to identify what other modules are installed on device 106d.

A carrier may decide to invoke or not invoke functionalities provided by an embodiment. As such, a carrier invocation flag may be set and its value may be stored at provisioning server 118. SAM 302B may check the status of the flag at any instance, such as when SAM 302B retrieves account information from provisioning server 118.

Figure 4:
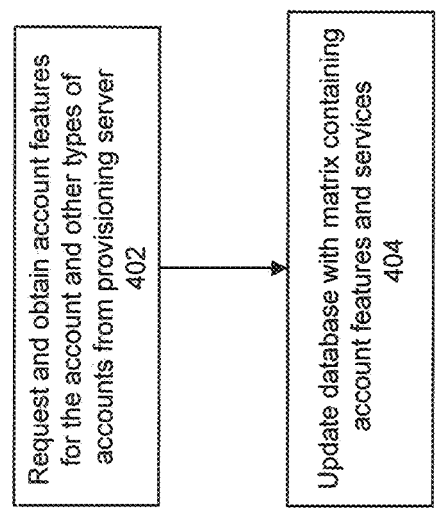
FIG. 4 is a flowchart of an example account identification process executed by the service access process in the communication device of FIG. 2 according to an embodiment.

Now, referring to FIG. 4, as part of analyzing a service request initiated by device 106, device 106d is provided with information regarding the features of the account associated with device 106d for network 114. Such information is typically stored centrally, such as on provisioning server 118. Process 400 shows an example account inquiry process conducted on device 106d, typically by SAM 302B. Periodically, device 106d may request and/or be provided with a current status of an account that is associated with device 106d and/or its user. At process 402, device 106d initiates a request for account particulars from provisioning server 118. Once the request is received at server 118, server 118 will review its records and provide a response to device 106d. At process 404, once the response from server 118 is received at device 106d, device 106d will update its records to reflect the current account and selected additional information, such as current remaining values for downloads, access time, associated with the account, additional accounts available to device 106d, additional services available to device 106d and a mapping of additional accounts to additional services. This data is stored at device 106d or stored at a location in system 100 that is accessible to device 106d.

Device 106d may obtain data relating to the accounts and their parameters from server 118 and may also receive data on the current account associated with it and any current usage levels tracked for it. If the account is associated with a user (e.g. an Internet account), then a similar process is used to retrieve data relating to that user account.

Figure 5A:
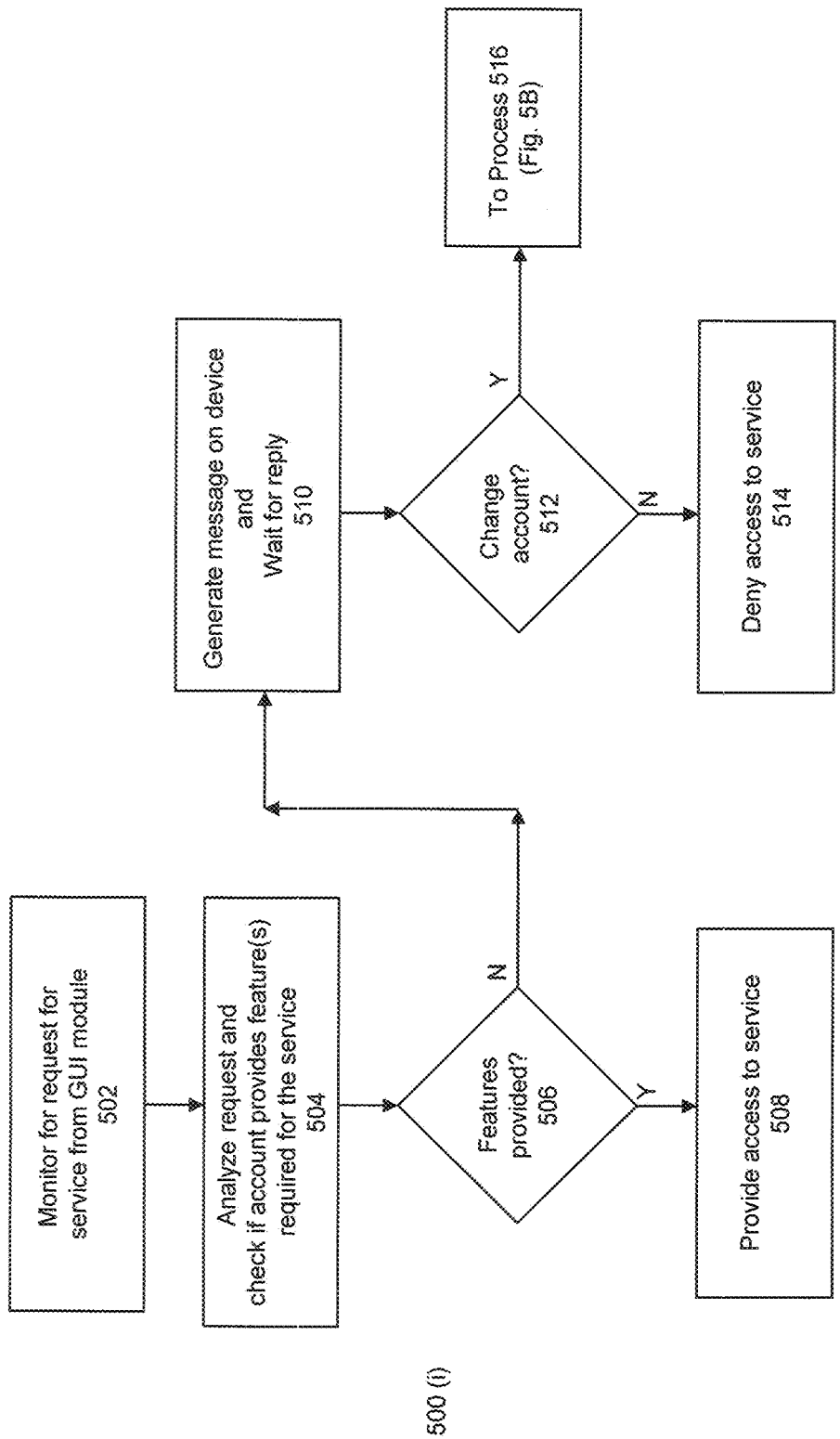

Next, referring to FIGS. 5A and 5B, details are provided on an aspect of an embodiment in processing a request for a service and analyzing the request against features of an account associated with device 106d, as shown in process 500 (i) and (ii), which collectively provide process 500. Functions of process 500 are implemented in SAM 302B. In other embodiments, functions of process 500 may be distributed in one or more modules, components and applications in device 106d and other devices in system 100.

Next, in process 502, SAM 302B monitors for receipt of a request for a service. One source of a request is from a user's input, activating an application or a service (e.g. activating a "Facebook" icon) on device 106d. Another source is a request generated from an application or another module operating on device 106d. Still another source is a request received by device 106d from another device (e.g. a device that is tethered to device 106d). As part of an initial message exchange, SAM 302B may contact a related module on device 106d that is associated with the service. For example, for a Facebook connection request, SAM 302B may exchange some initial messages with Facebook module 302A on device 106d. Facebook module 302A may generate some initial signon GUIs on device 106d and prompt the user to provide login credentials for an account, per GUI 600 (FIG. 6A). At this time device 106d has not yet made a connection to the related Facebook application server 104.

Next, at process 504, the request is analyzed to determine whether it can be granted. Some general system checks may be provided in this process. For example, a check may be conducted to determine if there is a network connection available to device 106d. If no communication link is available (e.g. due to a network failure), then an error message can be displayed on a display of device 106d, indicating that there is a general network failure. However, for process 504 an embodiment analyzes account features that are required for the requested service against the features of the current account associated with device 106d and/or its user that go beyond a basic check to determine if the communication link is active. The current account features were provided to device 106d per process 400 (FIG. 4).

Then, at process 506, a comparison is conducted between the account features that are required for the requested service and the features of the current account. If the features of the account provide sufficient and necessary network connections or other resources (e.g. bandwidth, data limits, etc.), then it is determined that device 106d can be provided with access to the requested service, per process 508. Other characteristics may also be checked, such as the battery level of device 106d, the strength of the communication connection for device 106d, the current data usage and remaining data usage for the account for device 106d, the current location of device 106d etc. These other characteristics may need to meet a threshold in order to grant access to the service. However, if the features of the account (and any other characteristics of device 106d) do not provide sufficient and necessary network connections or other resources for the requested service, then the device 106d is not provided with access to the service and process 500 moves to process 510 to initiate adjustment measures for the account. There may be other restrictions or checks made, such as temporal checks for blackout periods or allowed transaction periods.

To start the adjustment measures, process 510 is initiated to generate a notification on the display of device 106d that the service cannot be provided on device 106d because of a limitation of the current account (see GUI 602, FIG. 6A), which is shown as a pop-up message window. This message is helpful because it provides additional context to the user of device 106d with more details as to why the service cannot currently be provided to device 106d. The message may include text that states that the current account associated with device 106d does not support the requested service. As part of generating the message, the related GUI may provide selections to close the request (button 604, FIG. 6A) or to investigate other accounts (button 606, FIG. 6A) and wait for a response. An embodiment may provide customizations for the message to include logos, trademarks and to use specific fonts and graphics.

Next, at process 512, in SAM 302B (and device 106d) a response is provided to the selections by the user. If the user selects to close the request, then effectively no further action needs to be conducted and access to the service is denied, per process 514. A termination message may be generated at this time.

However, if the user selects to investigate other accounts, then process 500 continues to process 516. At process 516, a further analysis of other types of accounts that are available to device 106d from network 114 is conducted to attempt to identify any additional accounts that have sufficient and necessary features that would enable the requested service to be provided on device 106d. The other account features may have been provided to device 106d per process 400 (FIG. 4). If no other account is available to device 106d that can provide the features required by the service, then process 516 ends and the process proceeds to process 514 to end.

In addition to examining features of other accounts, other conditions (notably operating conditions of device 106d and/or network 114) may also be examined as part of the analysis. Exemplary conditions/characteristics may include one or more of the following parameters:
- the current power connectivity and/or battery capacity of device 106d;
- expected/required data transmission rate, transmission power levels and type of connection that are expected to be required to properly support the service on device 106d; and
- expected maximum/minimum/desired connection time (e.g. 5/10/15/45/60/120+ etc. minutes) for the service.

If other account(s) are identified as having have the required features for the requested service (and if other conditions also allow access to the service), then options relating to the other accounts is provided on device 106d. Details of the other accounts are collected and a message is generated on the display of device 106d providing a selection of the accounts that can be reviewed and selected by the user of device 106d, per GUI 608a with options 610a, b, c and *d* (FIG. 6B). Alternatively, a list of all available accounts may be provided on device 106d without analyzing their features against the requirements of the service. In one embodiment GUI 608a shows all available alternative accounts (610a-d) for device 106d therein. In another embodiment, GUI 608b shows a list of all available alternative accounts, but also highlights, in some manner, a subset of the accounts that have features that would permit device 106d to access the requested service (610a-b). In another embodiment, GUI 608c shows a list of only available alternative accounts that have features that would permit device 106d to access the requested service (610a-b).

An embodiment may also provide a list of accounts and plans that are available to device 106d in certain circumstances relating to device 106d. For example, when device 106d is roaming outside its "standard" coverage area, this condition may be detected and an embodiment may display a list of roaming plans that would enable the user to activate a roaming access package for device 106d, allowing the user to avoid roaming charges.

An embodiment may also provide a list of accounts and plans that are available to device 106d in certain circumstances relating to a user of device 106d. For example, an account may be identified as having a high usage rate. This identification may be made through usage data or external data from the service providers. This condition may be detected and an embodiment may display a list of additional services or plans that would enable the user to activate a plan/change an account that has would increase the service levels for device 106d.

As an alternative or additional analysis, SAM 302B may attempt to identify alternative features that may be used to provide access to the requested service. For example, for network 114, a connection to Facebook application server 104 is provided through the network architecture. However, an alternative access may be provided to Facebook server 104 through an alternative network, such as a Wi-Fi network (that makes an alternative connection to network 114, which then provides the connection to server 104). Similarly, a secondary server (not shown) may provide a comparable or mirrored service as Facebook server 104. As such, provisioning server 118 and/or device 106d may also track alternative connection schemes for the requested service or alternative service providers for the requested service. Further still, an alternative service may be identified as a replacement for the requested service. For example, instead of providing a social network service from Facebook (as requested), an alternative service can be identified, such as MySpace (trade-mark). Such information may be stored and tracked in server 118, per Table B. As such, process 516 may also identify an alternative service(s) for the service for the communication device; display a message on the display listing the alternative service(s); receiving message to select an alternative source; and initiating a request to the alternative source for the alternative service.

Tracking alternative connections and alternative services may be kept in data in device 106d and/or in provisioning server 118. Options for these alternatives may be provided in GUI 618 (FIG. 6D) on device 106d as part of process 516.

Once GUI 608a-c is generated, SAM 302B waits for the user to input his selection.

Next, at process 518 a response selection is provided to the selections by the user. If the user selects an account that does not provide the required features for the requested service then process 518 transits to process 520, where a message indicating that the selected account is not sufficient is generated on the display of device 106d and access to the service is denied, per process 514. However, if the user selects an account that does provide the required features for the requested service then process 518 transits to process 522. As part of process 518, if an alternative connection scheme for the requested service is provided then a different message may be generated, providing details on the alternative scheme. If an alternative service provider for the requested service has been selected (e.g. a Wi-Fi connection as opposed to an Internet connection), then again a different message may be generated, providing details on the alternative service provider. In both the alternative service provider and alternative connection scheme cases, SAM 302B may need to activate different connection components in device 106d and/or different application interface modules 302. For the latter case, if an alternative service to Facebook was selected (e.g. a MySpace server—trade-mark), then Facebook module 302A is be terminated and a corresponding MySpace module (not shown) is activated and initiated to make a connection request to the corresponding MySpace server 104 in network 114. There may be (positive and negative) characteristics associated with the alternatives (e.g. faster communication link, more expensive communication link, etc.). The characteristics may be collectively graded and ranked and the alternatives may be provided in a list in an order based on the rankings.

In process 522, the account for device 106d is updated. In one embodiment SAM 302B sends a message to server 104, requesting the addition of the feature the user has chosen. SAM 302B then sends a request to the carrier to update the account. This request may be sent to another server in network 114 or to provisioning server 118. That server, upon successful purchase/upgrade of the user's plan, notifies provisioning server 118 of success. Provisioning server 118 then updates service records for device 106d. This update is detected by SAM 302B and subsequently allows access to the service. Alternatively, this may be achieved by SAM 302B sending a message to provisioning server 118 indicating of the upgrade in the account. Provisioning server would then update its records to reflect the revised account for device 106d and may send a message to SAM 302B indicating that the account has been updated. Once SAM 302B determines that the account has been updated, then a success message may be generated (per GUI 612 with radio button 614, FIG. 6C). Finally, process 508 is executed, where device 106d is provided access to the requested service. For the example Facebook service request, communications are provided between SAM 302B and Facebook module 302A to indicate that device 106d is provided access to Facebook application server 104 and a connection is established between device 106d and application server 104 through Facebook module 302A. GUI 616 (FIG. 6C) shows a resulting GUI on the display of device 106d once a connection to Facebook application server 104 is provided to device 106d. Similarly, a secondary server (not shown) may provide a comparable or mirrored service as Facebook server 104. As such, provisioning server 118 and/or device 106d may also track alternative connection schemes for the requested service or alternative service providers for the requested service. Options for these alternatives may be provided in another GUI on device 106d as part of process 516. As an additional function, if the user selected an account that does provide the required features for the requested service then the account may still be updated to the selected account in any event.

Figure 6D:
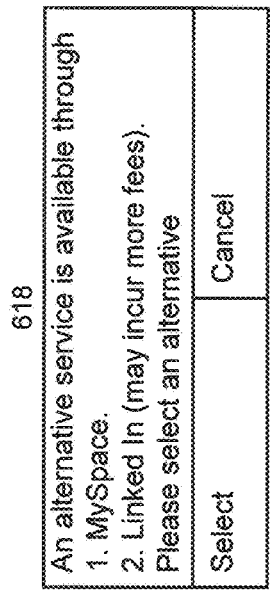

Referring to FIGS. 6A-6D, a summary of exemplary GUIs generated on device 106d as process 500 is executed are shown. In FIG. 6A, GUI 600 is an initial GUI generated by Facebook module 302A when device 106d makes an initial request to access Facebook application server 104. This GUI is generated before device 106d has been cleared to access server 104. In FIG. 6A, when it is determined that device 106d does not have an account that has sufficient features to allow access to Facebook application server 104, then GUI message 602 is generated on top of GUI 600. Message 602 provides more details as to why access to server 104 has been currently denied. If the user of device 106d wishes to investigate possible account alternatives, once process 500 completes its analysis, one of GUIs 608a-c is generated (FIG. 6B). GUI 618 (FIG. 6D) shows a message generated when alternative services are offered to device 106d, showing as an example two alternatives and some of their characteristics. Once a user has selected an upgraded account GUI 612 providing a success message.

While process 500 was described above for an example context of providing access to a Facebook server, other access requests, such as an access to a map server and access to a text messaging service follow comparable features of an embodiment as described above. For an example map server, one characteristics of an account on device 106d is that it includes a data limit (to download/upload data) that allows access to the map service and/or has an account that has sufficient current reserves in its data limit to access the map service.

It will be seen that process 500 provides flexibility in designating required features for an account for a requested service. For example, servers 104 that connect to network 114 may lack sufficient distinguishing features amongst them that would enable them to be individually identified by an account that simply provides access to network 114. However, by providing specific account types that identify specific features and by providing an intermediary interface through (Facebook) module 302A for device 106d permits an embodiment to clearly define specific servers 104 that can be accessed for specific account types.

It will be appreciated that processes described for processes 400 and 500 may be executed in various orders, in parallel and in different modules, while still performing the functions recited therein. It will further be appreciated that all or part of processes described for processes 400 and 500 may be executed in other devices, servers and components in system 100 when device 106d makes its service request.

For example in one embodiment, process 500 is conducted in a module that combines one or more functions of both SAM 302B and one or more interface modules, such as Facebook module 302A. For another example, one or more features of process 500 are executed at server 118 (or another location accessible in network 114) and device 104d communicates with server 118 (or other servers) as needed when accessing a service.

With aspects of main features of an embodiment described, further detail is now provided on internal components in device 106d.

Figure 7:
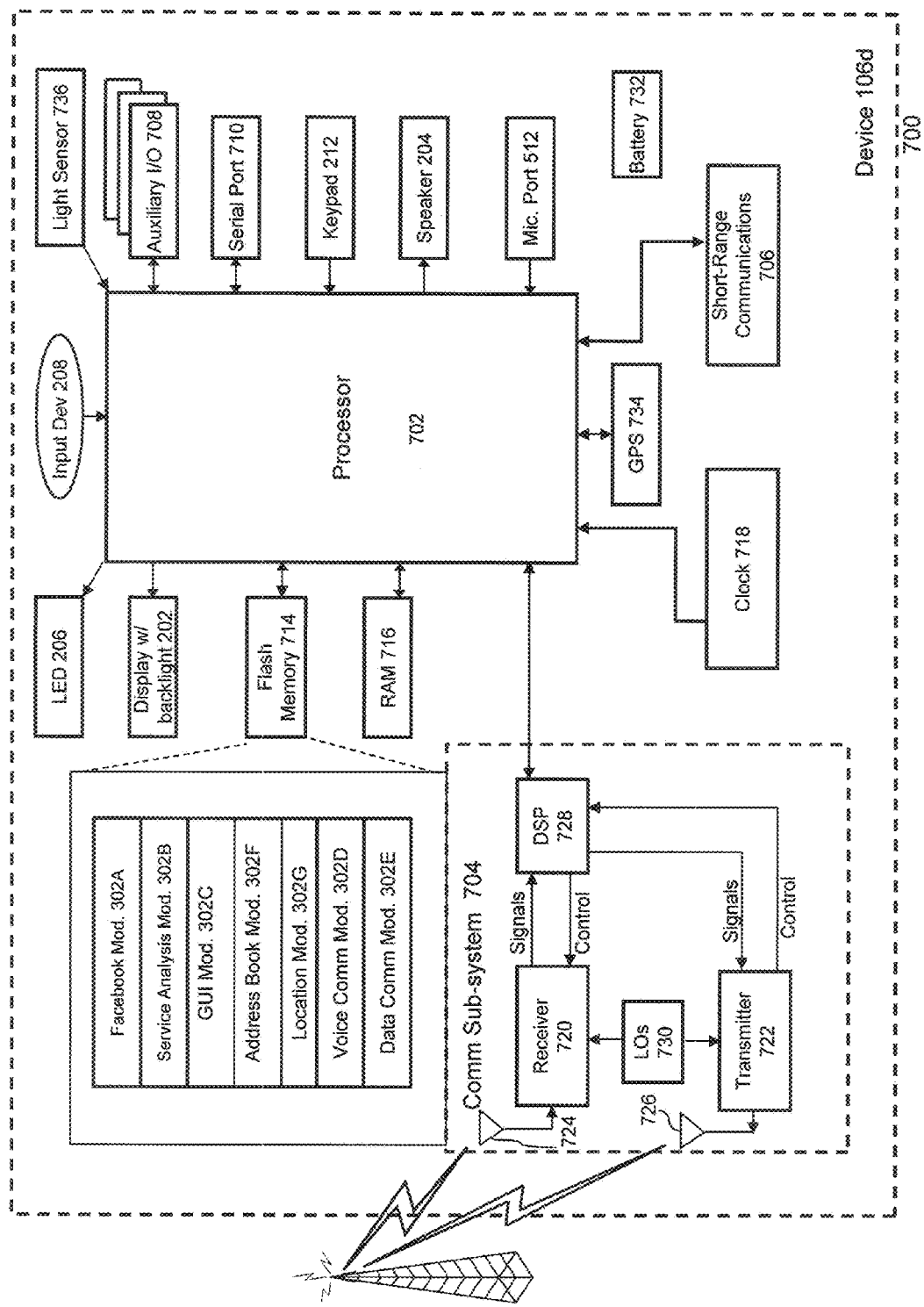
FIG. 7 is a block diagram of certain internal components of the communication device of FIG. 2.

Referring to FIG. 7, functional components of device 106d are provided in schematic 700. The functional components are generally electronic, structural or electro-mechanical devices. In particular, processor 702 is provided to control and receive almost all data, transmissions, inputs and outputs related to device 106d. Processor 702 is shown schematically as coupled to keypad 212 and other internal devices. Processor 702 preferably controls the overall operation of device 106d and its components. Exemplary processors for processor 702 include processors in the Data 950 (trade-mark) series, the 6200 series and the PXA900 series, all available at one time from Intel Corporation. Processor 702 is connected to other elements in device 106d through a series of electrical connections to its various input and output pins. Processor 702 has an IRQ input line which allows it to receive signals from various devices and modules. Appropriate interrupt firmware is provided which receives and reacts to the signals detected on the IRQ line.

In addition to processor 702, other internal devices of device 106d are shown schematically in FIG. 7. These include: display 202; speaker 204; keypad 212; communication sub-system 704; short-range communication sub-system 706; auxiliary I/O devices 708; serial port 710; microphone port 712 for microphone 216; flash memory 714 (which provides persistent storage of data); random access memory (RAM) 716; clock 718 and other device sub-systems (not shown). Device 106d is in one example a two-way radio frequency (RF) communication device having voice and data communication capabilities. In addition, device 106d in one example has the capability to communicate with other computer systems via the Internet.

Device 106d is operable to conduct wireless telephone calls, using any wireless phone system. Example technologies are any known wireless phone systems such as a Mobitex (trade-mark) network, a DataTAC (trade-mark) network, a General Packet Radio Service (GPRS) network and also a variety of data and voice communication networks, such as Advanced Mobile Phone Service (AMPS), Time Division Multiple Access (TDMA), Code Division Multiple Access (CDMA) system, wireless CDMA, CDMA 2000 system, Cellular Digital Packet Data (CDPD) system, Personal Communication Service (PCS), Global System for Mobile Communication (GSM), Wi-Fi networks, 3GPP Long Term Evolution (LTE) networks, etc. Other wireless phone systems that device 106d may support may include Wireless WAN (IMS), Wireless MAN (Wi-Max or IEEE 802.16), Wireless LAN (IEEE 802.11), Wireless PAN (IEEE 802.15, Zigbee (trade-mark) and Bluetooth (trade-mark)), high-speed data packet access (HSDPA) networks, Evolved High Speed Packet Access (HSPA+) networks, etc. and any others that support voice and data. Additionally, a Bluetooth network may be supported. Other embodiments include Voice over IP (VoIP) type streaming data communications that may simulate circuit-switched phone calls. Device 106d may have capabilities of communicating with other devices using other communication technologies, including instant messaging (IM) systems, text messaging (TM) systems and short message service (SMS) systems.

Operating system software executed by processor 702 is preferably stored in a computer-readable medium, such as flash memory 714, but may be stored in other types of memory devices, such as read-only memory (ROM) or similar storage element. In addition, system software, specific device applications, or parts thereof, may be temporarily loaded into a volatile store, such as RAM 716. Communication signals received by the mobile device may also be stored to RAM 716.

In addition to an operating system operating on device 106d, additional software modules 302 enable execution of software applications on device 106d. A set of software (or firmware) applications, generally identified as modules 302, that control basic device operations, such as voice communication module 302D and data communication module 302E, may be installed on device 106d during manufacture or downloaded thereafter. As well, other software modules are provided, such as Facebook module 302A, SAM 302B, GUI module 302C, calendar module 302D, address book 302E and location module 302F.

Messages received and/or generated by any module 302 may be processed by data communications module 302E, including Facebook module 302A and SAM 302B. Messages may be transmitted/received in network layer communications, emails, and/or other messaging systems to network 114. Module 302E receives messages from external devices 106, servers 104 and server 118, extracts relevant information from them and provides the information to relevant modules (such as SAM 302B and Facebook module 302A).

SAM 302B also controls how and when connection requests for servers 104, applications and services in network 114 are evaluated per process 500 (FIGS. 5A and 5B). Communications and data are streamed through either communication modules 704 or 706. SAM 302B may also receive signals from other modules providing information to it on other modules that are using communication modules 704 or 706. Processes to evaluate and authenticate connection requests from external device in network 114 may be provided in SAM 302B.

GUI module 302C is software and/or firmware that provides GUIs in generating display screens on display 202 of device 106d, such as screens shown in FIG. 6A-6D. GUIs that receive data and account requests from input screens are processed by SAM 302B and are provided to other modules, such as Facebook module 302A.

Data associated with each application, the status of one or more networks, profiles for networks and trigger conditions for commands for networks can be stored and updated in flash memory 714.

Communication functions, including data and voice communications, are performed through the communication sub-system 704 and the short-range communication sub-system 706. Collectively, sub-systems 704 and 706 provide the signal-level interface for all communication technologies processed by device 106d. Various modules 320 provide the operational controls to further process and log the communications. Communication sub-system 704 includes receiver 720, transmitter 722 and one or more antennas, illustrated as receive antenna 724 and transmit antenna 726. In addition, communication sub-system 704 also includes processing modules, such as digital signal processor (DSP) 728 and local oscillators (LOs) 730. The specific design and implementation of communication sub-system 704 is dependent upon the communication network in which device 106d is intended to operate. For example, communication sub-system 704 of device 106d may on network technologies described earlier (e.g. GPRS, 802.11 network, Bluetooth networks, AMPS, TDMA, CDMA, CDMA 2000, PCS, GSM, WWAN, WMAN, WLAN, WPAN (Bluetooth), IM, TM, SMS, etc.).

Short-range communication sub-system 706 enables communication between device 106d and other proximate systems or devices, which need not necessarily be similar devices. For example, the short-range communication sub-system may include an infrared device and associated circuits and components, a Wi-Fi or a Bluetooth (trade-mark) communication module to provide for communication with similarly enabled systems and devices. Sub-system 706 may have one or more inputs or outputs to sub-system 504 in processing signals for its networks.

In addition to processing communication signals, DSP 728 provides control of receiver 724 and transmitter 722. For example, gains applied to communication signals in receiver 724 and transmitter 722 may be adaptively controlled through automatic gain-control algorithms implemented in DSP 728. One particular operational aspect of receiver 720 and antenna 724 is that they need to be tuned to receive signals in the 802.11 network bands, e.g. signals in the 2.4 GHz to 5.8 GHz range for sub-systems 706 and if needed, sub-system 704. Additional filters on antenna may also be used to provide such functionality.

Receiver 720 and antenna 724 provide at least some of the hardware and software elements needed to detect when device 106d is in the presence of communication signals from network 120, thereby enabling device 106d to communication with other devices in networks 114 and 120.

Powering the entire electronics of the mobile handheld communication device is power source 732. In one embodiment, power source 732 includes one or more batteries. In another embodiment, the power source 732 is a single battery pack, especially a rechargeable battery pack. A power switch (not shown) provides an "on/off" switch for device 106d. A power source interface (not shown) may be provided in hardware, firmware, software or a combination of such elements to selectively control access of components in device 106d to power source 732. Upon activation of the power switch an application is initiated to turn on device 106d. Upon deactivation of the power switch, the application is initiated to turn off device 106d. Power to device 106d may also be controlled by other devices and by software applications 302.

Device 106d may also have global positioning system (GPS) 734 to assist in identifying a present location of device 106d and may also have light sensor 736 to provide data on the ambient light conditions for device 106d.

It will be seen that embodiments described for processes 400 and 500 (FIGS. 4, 5A and 5B) are "pull" based, where accounts are reviewed and alternatives identified when an event occurs, namely a request for a service. Further these embodiments are provided on device 106d. In other alternative embodiments, a "push" based system may be provided, where account alternatives are identified and offered when events external to device 106d occur, e.g. a change in a Facebook service, deployment of a new alternative service or communication network, etc. It will be appreciated that SAM 302B, Facebook module 302A, GUI module 302C and other modules in the embodiments can be implemented using known programming techniques, languages, processes and algorithms. Although the modules, processes and applications described are implemented in device 106d, it will be appreciated that some functions of the modules may be provided in a separate server that is in communication with device 106d. The titles of the modules are provided as a convenience to provide labels and assign functions to certain modules. It is not required that each module perform only its functions as described above. As such, specific functionalities for each application may be moved between applications or separated into different applications. Modules may be contained within other modules. Different signalling techniques may be used to communicate information between applications using known programming techniques. Known data storage, access and update algorithms allow data to be shared between applications. It will further be appreciated that other applications and systems on device 106d may be executing concurrently with other modules. As such, any of modules 302 (or parts thereof) may be structured to operate in as a "background" application on device 106d, using programming techniques known in the art.

It will be appreciated that the embodiments relating to client devices, server devices and systems may be implemented in a combination of electronic modules, hardware, firmware and software. The firmware and software may be implemented as a series of processes, applications and/or modules that provide the functionalities described herein. The modules, applications, algorithms and processes described herein may be executed in different order(s) and in parallel. Interrupt routines may be used. Data, applications, processes, programs, software and instructions may be stored in volatile and non-volatile devices described and may be provided on other tangible medium, like USB drives, computer discs, CDs, DVDs or other substrates herein and may be updated by the modules, applications, hardware, firmware and/or software. The data, applications, processes, programs, software and instructions may be sent from one device to another via a data transmission.

As used herein, the wording "and/or" is intended to represent an inclusive-or. That is, "X and/or Y" is intended to mean X or Y or both.

In this disclosure, where a threshold or measured value is provided as an approximate value (for example, when the threshold is qualified with the word "about"), a range of values will be understood to be valid for that value. For example, for a threshold stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given threshold may be a value that is within the provided threshold, having regard to the approximate value applicable to the threshold and the understood range of values (over and under) that may be applied for that threshold.

The present disclosure is defined by the claims appended hereto, with the foregoing description being merely illustrative of embodiments of the disclosure. Those of ordinary skill may envisage certain modifications to the foregoing embodiments which, although not explicitly discussed herein, do not depart from the scope of the disclosure, as defined by the appended claims.

The invention claimed is:

1. A method of managing requests for a service by a communication device in a communication network, the method comprising: at the communication device:
   receiving a request for the service, the service comprising a set of features required to provide access to the service via the communication network, the set of features including at least one network feature required to provide access to the service;
   determining whether account features of a current account associated with the communication device include the set of features required to provide access to the service, wherein the current account associated with the communication device is one of a plurality of available accounts provided by a network carrier for the communication system; and
   absent determining that the account features of the current account associated with the communication device includes the set of features required to provide access to the service:
   identifying an alternative service to the service;
   displaying, on a display of the communication device, the alternative service, wherein the alternative service that is displayed is selectable; and
   in response to receiving a selection of the alternative service, initiating a request for the alternative service.

2. The method of managing requests for a service by a communication device as claimed in claim 1, further comprising, prior to identifying,
   displaying, on the display, a first message indicating that access to the service is denied, the message including a first selectable button to close the request and a second selectable button to identify alternative accounts for the communication device;
   in response to detecting selection of the second selectable button:
      identifying an alternative account from the plurality of available accounts provided by the carrier for the communication network, the alternative account comprising alternative account features, the alternative account features including the set of features that are required to access the service;
      displaying, on the display, a second message comprising the alternative account, wherein the alternative account that is displayed is selectable; and
      in response to receiving a selection of the alternative account, sending a request to an account manager to associate the alternative account with the communication device.

3. The method of managing requests for a service by a communication device as claimed in claim 1, further comprising:
   in response to determining that the account features of the current account associated with the communication device include the set of features required to provide access to the service, providing access to the service.

4. The method of managing requests for a service by a communication device as claimed in claim 1, wherein:

determining whether the account features of the current account associated with the communication device includes the set of features required to access the service comprises comparing each respective account feature of the current account against each respective feature of the set of features required to access the service.

5. The method of managing requests for a service by a communication device as claimed in claim 2, wherein identifying the alternative account comprises identifying a plurality of alternative accounts from the plurality of available accounts provided by the carrier for the communication network, each alternative account comprising alternative account features, the alternative account features including the set of features that are required to access the service.

6. The method of managing requests for a service by a communication device as claimed in claim 1, wherein displaying the second message further comprises displaying the plurality of alternative accounts in a list.

7. The method of managing requests for a service by a communication device as claimed in claim 1, further comprising:
when a communication link between the communication device and a server for the service is not established
displaying a third message on the display indicating that the communication link to the server is not established.

8. The method of managing requests for a service by a communication device as claimed in claim 1, wherein an address for a server associated with the service is used to control access to the service.

9. The method of managing requests for a service by a communication device as claimed in claim 1, wherein:
the service is a social media service; and
the set of features required to provide access to the service further includes a feature to authorize access to the social media service.

10. The method of managing requests for a service by a communication device as claimed in claim 1, wherein:
the service is a text messaging service; and
the set of features required to provide access to the service further includes a feature that allows access to the text messaging service.

11. A communication device comprising:
a display;
a processor;
a memory module for storing instructions for execution on the processor; and
a service analysis module for providing instructions for execution on the processor to
receive a request for the service, the service comprising a set of features required to provide the service via the communication network, the set of features including at least one network feature required to provide access to the service;
determine whether account features of a current account associated with the communication device includes the set of features required to provide access to the service, wherein the current account associated with the communication device is one of a plurality of available accounts provided by a network carrier for the communication system; and
absent determining that the account features of the current account associated with the communication device includes the set of I features required to provide access to the serviced:
identify an alternative service for the service for the communication device;
display, on the display, the alternative service, wherein the alternative service that is displayed is selectable; and
in response to receiving a selection of the alternative service, initiate a request for the alternative service.

12. The communication device as claimed in claim 11, wherein, prior to identifying, the service analysis module provides further instructions for execution on the processor to
display a first message on the display indicating that access to the service is denied for the communication device, the message including a first selectable button to close the request and a second selectable button to identify alternative accounts for the communication device;
in response to detecting selection of the second selectable button:
identify an alternative account from the plurality of available accounts provided by the carrier for the communication network, the alternative account comprising alternative account features, the alternative account features including the set of features that are required to access the service;
display on the display a second message comprising the alternative account, wherein the alternative account that is displayed is selectable; and
in response to receiving a selection of the alternative account, send a request to an account manager to associate the alternative account with the communication device.

13. The communication device as claimed in claim 12, wherein the service analysis module provides further instructions for execution on the processor to
in response to receiving the selection of the alternative account, provide access to the service.

14. The communication device as claimed in claim 12, wherein the service analysis module further provides instructions for execution on the processor to
determine whether the account features of the current account associated with the communication device includes the set of features required to provide the service by comparing each respective the account feature of the current account associated against each respective feature of the set of features required to access the service.

15. The communication device as claimed in claim 12, wherein
identify comprises identify a plurality of alternative account from the plurality of available accounts provided by the carrier for the communication network, each alternative account comprising alternative account features, the alternative account features including the set of features required to provide the service; and
display the second message comprises display the plurality of alternative accounts in a list.

16. The communication device as claimed in claim 12, wherein an address for a server associated with the service is used to control access to the service.

17. The communication device as claimed in claim 11, wherein the service analysis module further provides instructions for execution on the processor to
when a communication link between the communication device and a server for the service is not established
displaying a third message on the display indicating that the communication link to the server is not established.

18. The communication device as claimed in claim 11, wherein:
   the service is a social media service; and
   the set of features includes a feature to authorize access to the social media service.

19. The communication device as claimed in claim 11, wherein:
   the service is a text messaging service; and
   the set of features includes a feature to allow access to the text messaging service.

20. The communication device as claimed in claim 11, wherein the service analysis module further comprises computer-readable instructions executable by the processor to
   obtain, from a provisioning server, the account features of the current account associated with the communication device.

\* \* \* \* \*